United States Patent
Liu

(10) Patent No.: US 7,938,074 B2
(45) Date of Patent: May 10, 2011

(54) PRESSURE SENSING SYSTEM FOR A PLANTER

(75) Inventor: James Z. Liu, Belvidere, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/357,624

(22) Filed: Jan. 22, 2009

(65) Prior Publication Data

US 2010/0180808 A1 Jul. 22, 2010

(51) Int. Cl.
*A01C 5/00* (2006.01)
*A01C 13/00* (2006.01)
*A01C 15/00* (2006.01)
*B60C 23/00* (2006.01)
*B60C 23/02* (2006.01)

(52) U.S. Cl. ........ 111/200; 111/903; 111/164; 111/192; 111/194; 340/442; 73/146.2; 701/36

(58) Field of Classification Search .................. 111/130, 111/200, 903, 926, 164, 167, 168, 190–195; 340/442–448; 73/146, 146.2–146.5, 146.8; 701/36, 1

See application file for complete search history.

(56) References Cited

U.S. PATENT DOCUMENTS

| 5,606,113 A | * | 2/1997 | Sheen et al. | 73/32 A |
| 7,561,035 B2 | * | 7/2009 | Sahashi et al. | 340/442 |
| 2006/0290366 A1 | * | 12/2006 | Kon et al. | 324/760 |
| 2007/0137619 A1 | * | 6/2007 | Fader et al. | 123/435 |
| 2009/0115604 A1 | * | 5/2009 | Thomas et al. | 340/540 |

FOREIGN PATENT DOCUMENTS

SU 1643279 A1 * 4/1991
WO WO 2008/086283 7/2008

* cited by examiner

*Primary Examiner* — Christopher J. Novosad

(57) ABSTRACT

A pressure sensing system for a seeding machine such as a planter to measure the down force on a planter row unit uses a wireless pressure sensor embedded in a load carrying wheel of the row unit. In a preferred embodiment, the pressure sensor is a passive piezoelectric pressure sensor that is a transmitter only, transmitting both pressure and RFID the information that identifies the particular sensor. Multiple sensors may be employed in each wheel and sensors may be employed in more than one wheel of the row unit, such as the gauge wheels on opposite sides of the trench opening disks. The sensors may be made of a PVDF, a known piezoelectric material. A wireless receiver is located on the planter frame or could be located elsewhere to receive the signals from the pressure sensor. A controller determines from the signal, any change in down force and commands the change to a down force generator on the row unit.

9 Claims, 3 Drawing Sheets

PRESSURE SENSING SYSTEM FOR A PLANTER

BACKGROUND OF THE INVENTION

When planting with a conventional row crop planter having a plurality of row units mounted on a toolbar, it is necessary to provided a sufficient a down force on each row unit to ensure that the seed trench opener fully penetrates into the soil. To provide the necessary down force, each row unit is typically provided with a down force generator at the linkage mounting in the row unit to the toolbar. The down force generator may be a mechanical, spring type, generator that produces a fixed down force or which may provide for adjustment to vary the down force. Pneumatic or hydraulic down force generator's can also be used which facilitate electronic control of the magnitude of the down force. Proper down force control is also essential to provide the proper amount of soil compaction in the side walls of the seed trench.

In order to control the magnitude of the down force, it is necessary to measure the magnitude of the down force in real time during the planting operation. One method to measure of the down force is to provide a strain gage on a linkage used to support one of the ground engaging and load carrying the wheels of the row unit. Various a strain gage arrangements have been developed. One example is shown in patent application WO 2008/086283 A2. There, a load sensing pin, equipped with a strain gage, is used to mount the gauge wheel adjustment linkage. The down force is transmitted from the gauge wheel to the adjustment linkage and from there to the load sensing pin. A wiring harness then connects the load sensing pin to a controller, which is then interacts with an adjustable down force generator to produce the desired down force. The disadvantage of this load sensing pin it is the relatively high cost and necessity of a wiring harness.

SUMMARY OF THE INVENTION

The present invention provides a wireless down force sensor embedded in a load carrying wheel of the row unit to measure the down force. In a preferred embodiment, the pressure sensor is a passive piezoelectric pressure sensor that is a transmitter only, transmitting both pressure and RFID the information that identifies the particular sensor. Multiple sensors may be employed in each wheel and sensors may be employed in more than one wheel of the row unit, such as the gauge wheels on opposite sides of the trench opening disks. In one embodiment, the sensors may be made of a PVDF, a known piezoelectric material. PZT, quartz crystal or other known piezoelectric materials can also be used.

DESCRIPTION OF THE PREFERRED EMBODIMENT

Figure 1:
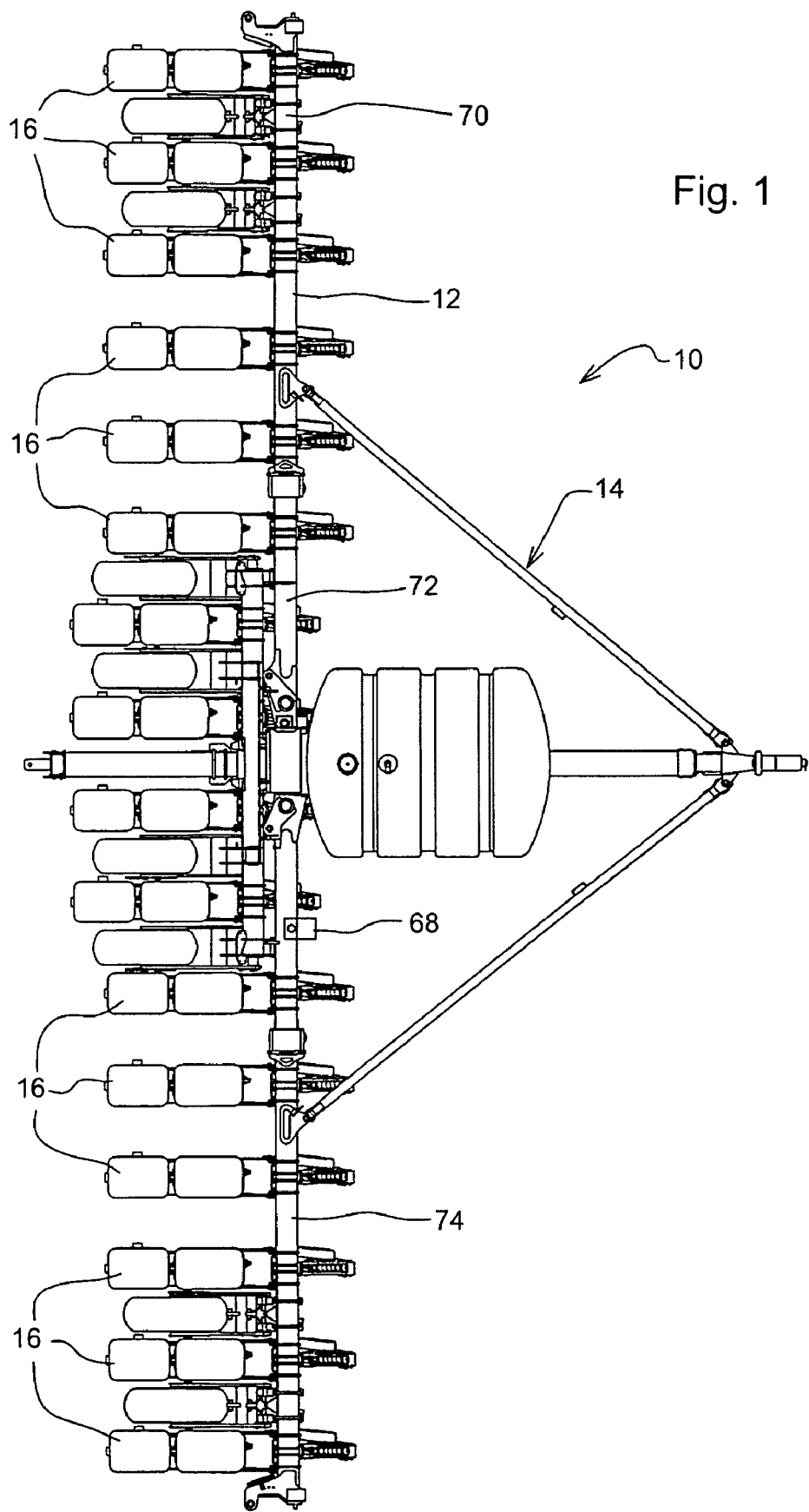
FIG. 1 is a plan view of a planter according to the present invention.
Figure 2:
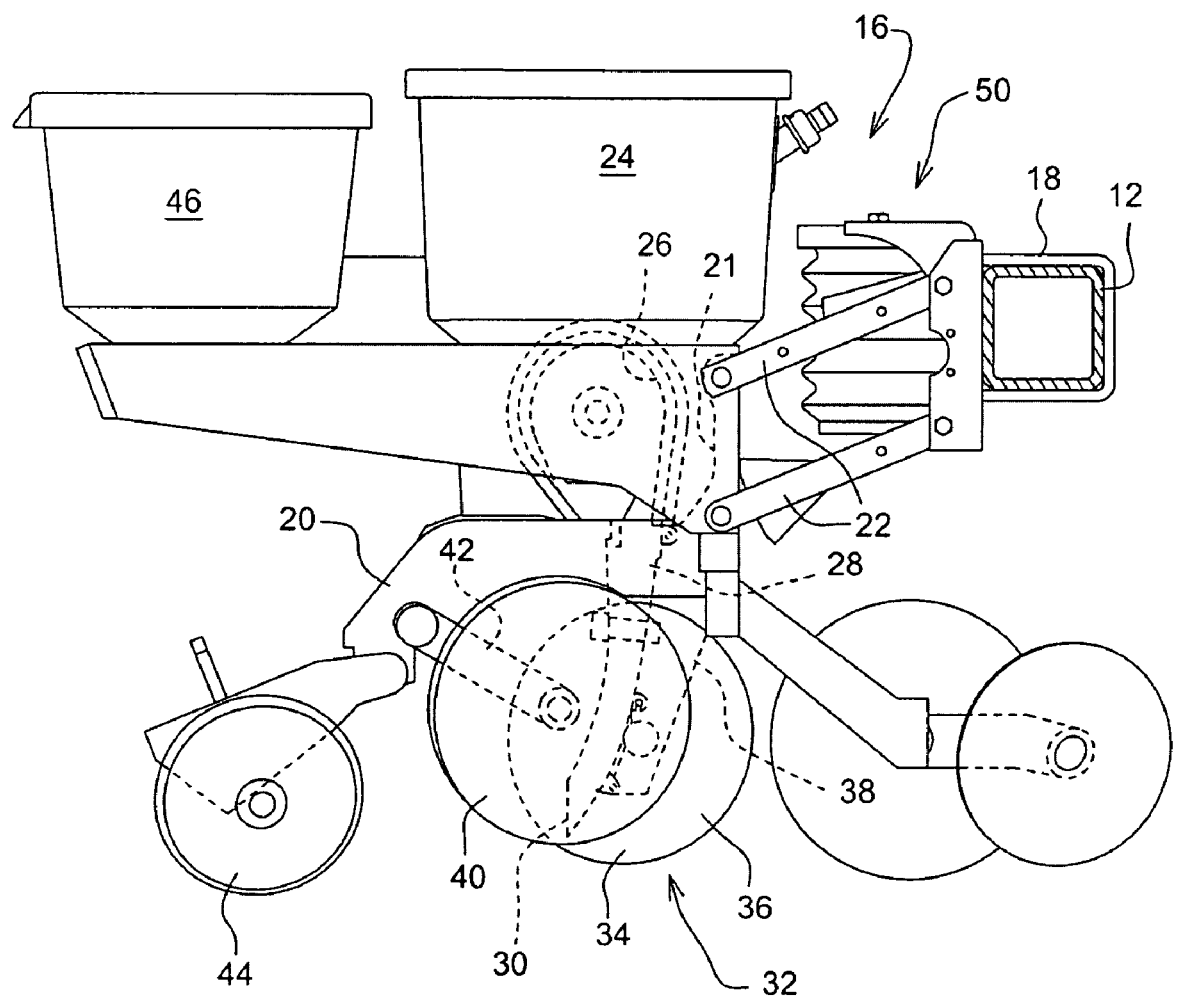
FIG. 2 is a side view of a row unit of the planter of FIG. 1.

With reference to FIG. 1, an example planter 10 is shown containing the down force pressure sensor system of the present invention. Planter 10 includes a tool bar 12 as part of a planter frame 14. Mounted to the tool bar are multiple planting row units 16. Row units 16 are typically identical for a given planter but need not be identical. A row unit 16 is shown in greater detail in FIG. 2. The row unit 16 is mounted to the tool bar 12 by U-bolts 18. The row unit 16 is provided with a central frame member 20 having a pair of upwardly extending arms 21 at the forward end thereof. The arms 21 connect to a parallelogram linkage 22 for mounting the row unit 16 to the tool bar 12 for up and down relative movement between the unit 16 and toolbar 12 in a known manner. Seed is stored in seed hopper 24 and provided to seed meter 26. From the seed meter 26 the seed is dropped through a seed tube 28. The lower end 30 of the seed tube is positioned just above a seed trench formed by a trench opener 32. The trench opener 32 consist of a pair of disks 34 that are mounted on axes inclined to one another such that the disks 34 meet at a point 36 at the lower front portion of the disks. The disks 34 are mounted to a downwardly extending arm 38 of the row unit frame member 20. The seed tube 28 is disposed immediately behind the arm 38, between the two disks 34 of the trench opener. A gauge wheel 40 is positioned on each side of the opener disks 34 and are positioned slightly rearward of the disks 34. The gauge wheels 40 are mounted to the row unit frame by arms 42 pivotally connected to the frame central member 20. A gauge wheel adjustment mechanism (not shown) enables of the vertical position of the gauge wheels 40 to be adjusted relative to the opener disks 34. This establishes of the depth to which the openers are inserted into the soil, i.e. the depth of the seed trench.

Seed drops through the open lower end 30 of the seed tube into the trench formed by the opener 32. A pair of closing wheels 44 are mounted to the central frame 20 rearward of the gauge wheels 40. The closing wheels 44 are also mounted on axes inclined to one another. The closing wheels push on the side walls of the seed trench to a close the trench over the seed therein.

In order to assure that the trench opener 32 is operating at the proper depth, it is necessary for the row unit 16 to apply a sufficient downward force on the soil. The weight of the row unit itself, as well as the weight of seed in the hopper 24 and chemicals in the chemical hopper 46 provide a portion of the vertical down force. However, the weight of the seed and chemicals is constantly changing during operation. To ensure that adequate down force is applied, a down force generator 50 is provided at the linkage 22. The down force generator pushes downward on the linkage 22, forcing in the row unit 16 downward relative to the to toolbar 12. The down force generator 50 is mounted to the toolbar 12 to act against the linkage 22. Preferably, the down force generator 50 is pneumatic or hydraulic to facilitate electronic control of the magnitude of the down force. In order to make adjustments in the down force in real time, it is necessary to measure the magnitude of the down force on an ongoing basis. Both the gauge wheels 40 and the closing wheels 44 are load carrying wheels that transmit a portion of the applied down force to the soil. To measure the down force, a passive and wireless piezoelectric pressure sensor is embedded in one or both of the gauge wheels 40 or closing wheels 44. One or more sensors can be provided in each of the gauge wheels or each of the closing wheels.

Figure 3:
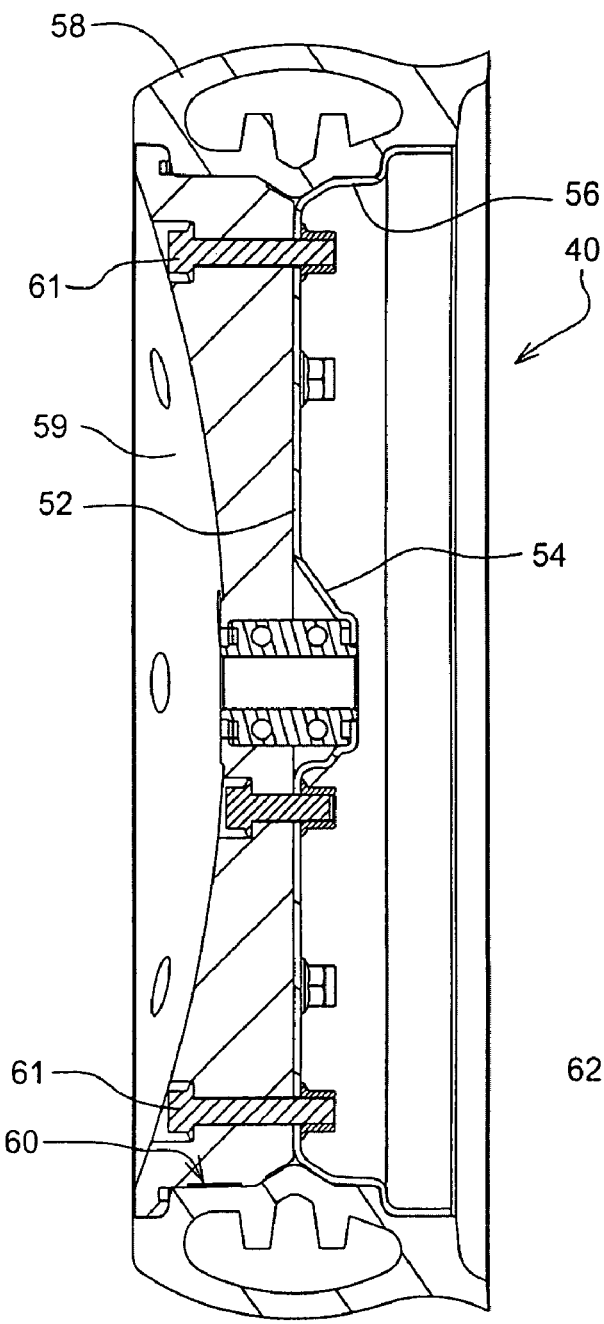
FIG. 3 is a cross-section of a gauge wheel of the row unit of FIG. 2.
Figure 4:
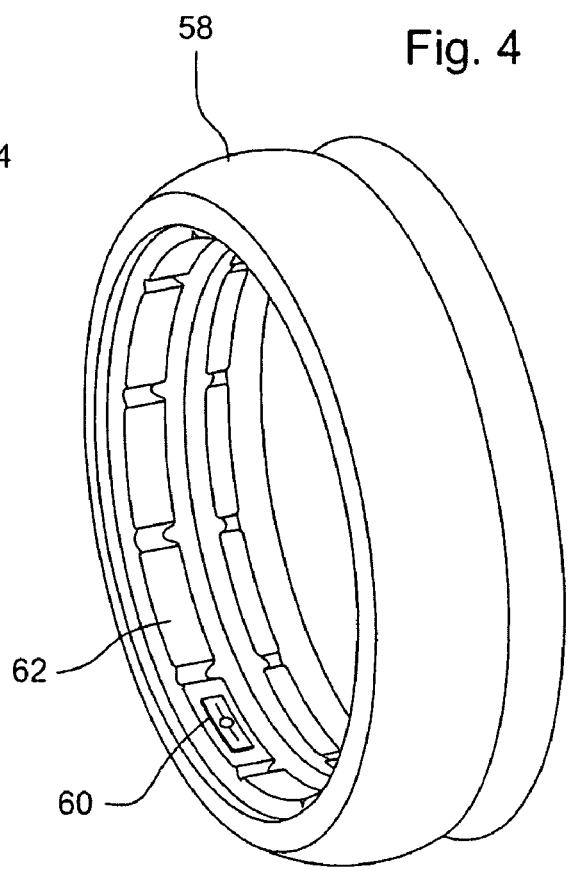
FIG. 4 is a perspective view of a tire from the gauge wheel of FIG. 3.
Figure 5:
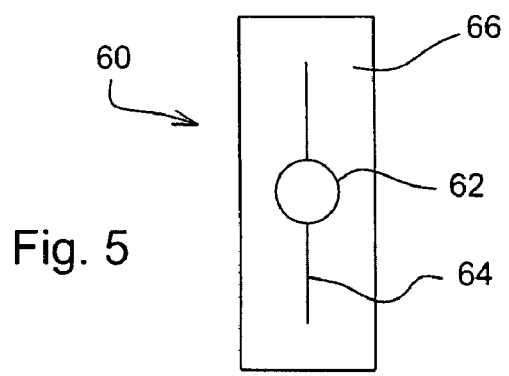
FIG. 5 is a top view of a pressure sensor use to measure the row unit down force.

A gauge wheel 40 is shown in FIG. 3. The gauge wheel 40 has a steel wheel 52 forming a mounting hub portion 54 and an outer rim portion 56. A natural or synthetic rubber tire 58 is mounted to the rim 56 about the periphery thereof. The tire 58 is mounted to the wheel 52 and retained by a cover member 59 attached to the wheel by bolts 61. The tire 58 is shown in FIG. 3 as being a hollow tire but is not inflated. Alternatively, the tire can have a solid core. The tire 58 is shown in FIG. 4 in with a pressure sensor 16 mounted to the inner surfaces 62 of the tire. The pressure sensors 60 is shown in FIG. 5 having a core 62 of polyvinylidene fluoride, or PVDF. PVDF is piezoelectric and is connected to a transmitting antenna 64. For ease of handling, in the core 62 and antenna 64 are mounted to a backing membrane 66. The sensor 62 is embedded with RFID information and is a pure transmitter. As the gauge wheel rotates, the pressure applied to the PVDF sensor as the sensor rotates over the soil surface produces an electric potential that powers the transmitter. The signal generated by the sensor indicates the magnitude of the pressure as well as RFID information to identify the sensor.

A wireless receiver 68 is mounted to the tool bar 12 receives the signals from the sensor 62. Depending on the size of the planter, multiple receivers may be used to receive signals from the sensors of all row units. In a preferred embodiment, each row unit is equipped with a pressure sensor to allow for independent adjustment of the down force at each row unit. However, a pressure sensor on one row unit can be used to adjust the down force of all of the row units of the planter if desired. As another alternative, each section of the toolbar can have one row unit equipped with the pressure sensor. With reference to FIG. 1, the toolbar 12 is shown with three sections, 70, 72 and 74. The receiver 68 is a pure receiver instead of a transceiver as used in automobile tire pressure sensing systems. The use of a pure receiver enables of the signal to noise ratio to be increased and reduces the sensor system cost.

The receiver 68 may utilize certain frequencies of the ISM band. Frequencies lower than 433 MHz are preferred due to their lower sensitivity to humidity variation, adequate bandwidth and better reflection reception in the planter environment.

The receiver 68 is connected to a controller, preferably located in the cab of a tractor pulling the planter 10. The controller receives the signal from the receiver 68 and compares that to the desired down force as determined by the machine operator. Changes in the down force are then commanded to the down force generator 50 either automatically by the controller or by manual adjustment by the operator. Manual adjustment can occur by operator input into the electronic controller following display of the down force on a monitor in the tractor cab or can be accomplished with a mechanical adjustment of the down force generator. In this manner, the down force can be maintain in view of dynamic field conditions. This ensures that the seed trench depth is maintained as desired and that the trench side walls are adequately compacted but not overly compacted.

While use of PVDF is preferred, other known piezoelectric materials can also be used such as, but not limited to, PZT or quartz crystal. In addition, rubber-based strain sensors which are capable of flexing with the gauge wheel tire, as described in the article *Rubber-based strain sensor fabricated using photolithography for intelligent tires* published in *Sensors and Actuators A: Physical*, vol. 148, pages 1-9, November 2008, incorporated herein by reference, can also be used.

The use of wireless sensors and receiver avoids the need for a wiring harness leading to each row unit. This reduces the sensing system cost and eliminates the often complex task of maintaining the wiring harness.

Having described the preferred embodiment, it will become apparent that various modifications can be made without departing from the scope of the invention as defined in the accompanying claims.

The invention claimed is:

1. A row unit for a seeding machine comprising:
   means forming a seed trench in the soil, means for delivering seed to the seed trench, and means for covering the seed in the seed trench;
   a ground engaging and load carrying wheel; and
   a wireless pressure sensor directly attached to said wheel generating an output signal indicative of the pressure between the wheel and the ground.

2. The row unit as specified in claim 1 wherein the signal includes a sensor identifier.

3. The row unit as specified in claim 1 wherein the ground engaging wheel is a gauge wheel to control the depth of the seed trench.

4. The row unit as specified in claim 3 having multiple said sensors in the gauge wheel.

5. The row unit as specified in claim 3 having a pair of said gauge wheels on opposite sides of the means forming a seed trench and at least one sensor in each said gauge wheel.

6. The row unit as specified in claim 1 wherein the ground engaging wheel is a trench closing wheel.

7. The row unit as specified in claim 1 wherein the sensor is a piezoelectric pressure sensor.

8. The row unit as specified in claim 7 wherein the piezoelectric sensor is a transmitter only.

9. The row unit as specified in claim 7 wherein the piezoelectric sensor is made of PVDF.

* * * * *